Dec. 19, 1967  W. E. WALTON  3,358,797
AUTOMATIC CONTROL SYSTEM AND APPARATUS
FOR VEHICLE PARKING BRAKES
Filed Oct. 20, 1965  2 Sheets-Sheet 2
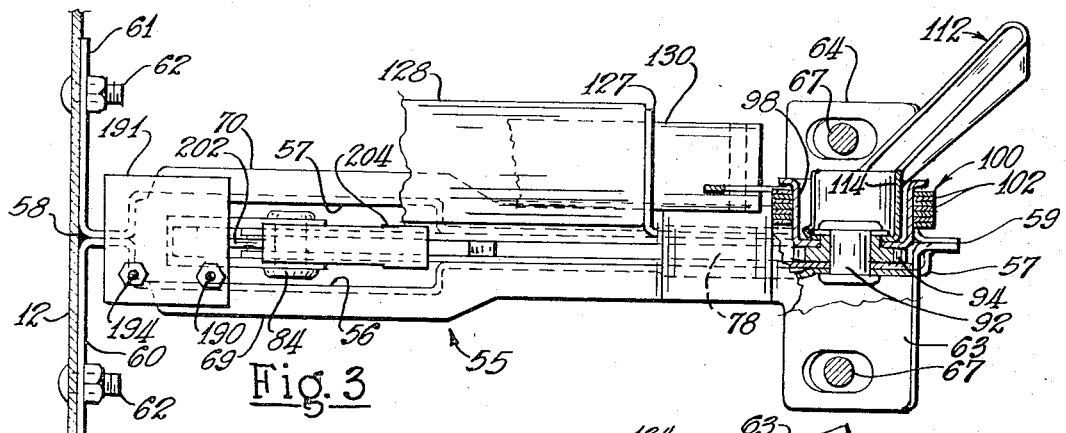
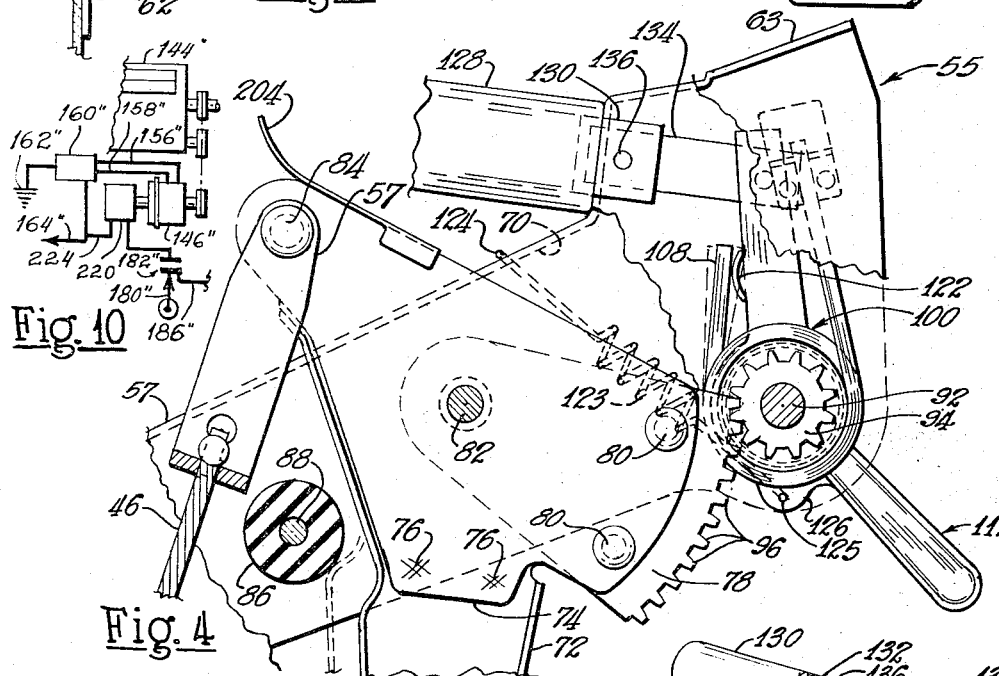
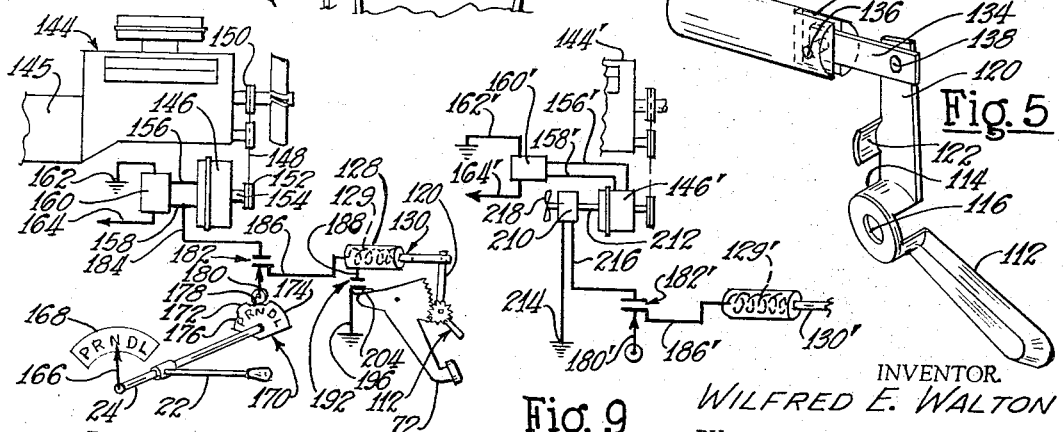
INVENTOR.
WILFRED E. WALTON
BY
Harry O. Ernsberger
ATTORNEY

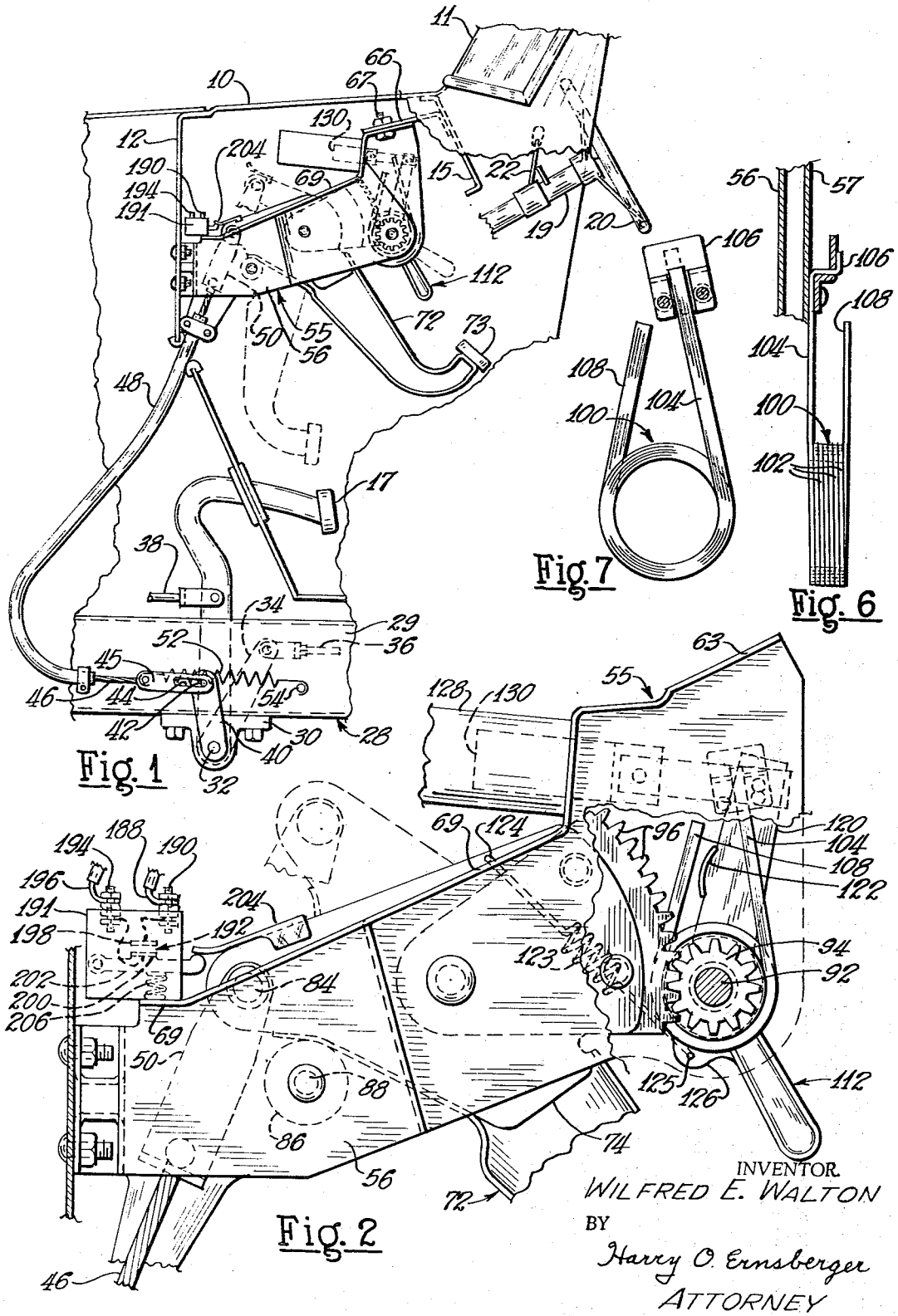

United States Patent Office 3,358,797
Patented Dec. 19, 1967

3,358,797
AUTOMATIC CONTROL SYSTEM AND APPARATUS FOR VEHICLE PARKING BRAKES
Wilfred E. Walton, Sylvania, Ohio, assignor to Universal American Corporation, New York, N.Y., a corporation of Delaware
Filed Oct. 20, 1965, Ser. No. 498,263
14 Claims. (Cl. 192—4)

ABSTRACT OF THE DISCLOSURE

The invention relates to a system and arrangement wherein an electrically-actuated release mechanism for a parking brake locking means is intercalated in circuit with an engine driven means or source of electric energy for effecting the release of the parking brake in conjunction with switch means in the circuit controlled by the position of the speed selector for automatically releasing the parking brake mechanism when certain operating conditions exist or are established.

---

This invention relates to an automatic control system and apparatus for parking brake mechanism for automotive vehicles and more particularly to electrically controlled automatic release means for a parking brake mechanism.

Parking brake mechanisms conventionally used on automotive vehicles embody a foot-operated or hand-operated lever or member connected with the parking brakes arranged to be actuated by the vehicle operator for setting the parking brake mechanism. Heretofore means has been provided for releasing the foot-operated pedal lever or manually operated member under control of the operator which is operative independent of other mechanisms of the vehicle.

One of the disadvantages of operator controlled release mechanism for parking brakes is that in the event the operator by inadvertence does not release the parking brake, the vehicle may be operated with the parking brake in "brake set" position.

Through such inadvertence the engine of the vehicle operates against the parking brake load and severe wear of the brake shoes ensues and their effectiveness may be destroyed by friction heat. The difficulties have been recognized by manufacturers of automotive vehicles as it has become conventional practice to provide a signal light on the vehicle instrument panel arranged to be illuminated when the ignition circuit for the engine is energized and the parking brakes are in a "brake set" position. However, unless the vehicle operator is alert to the signal light and releases the parking brake mechanism, the vehicle may be operated with the parking brakes in set position.

It has recently become conventional practice in the automotive field to employ an engine-driven alternator generating alternating current in lieu of an engine-driven direct current generator providing electrical energy for various components of the electrical system of an automotive vehicle. The alternating current generated by the alternator is rectified or converted by suitable conventional rectifier means to provide direct current for charging the conventional storage battery or accumulator of the vehicle.

The present invention embraces a system and arrangement wherein an electrically actuated release mechanism for a parking brake is intercalated in circuit with an engine-operated source of electric energy and switch means controlled by the position of the speed selector for automatically releasing the parking brake mechanism when certain operating conditions exist or are established.

The invention embraces a system and arrangement associated with the parking brake mechanism of an automotive vehicle of electrically activated means intercalated with the speed selector mechanism of the vehicle for automatically effecting release of the parking brakes from a "brake set" position when the vehicle engine is operating and the speed selector is moved to an operative position.

Another object of the invention resides in a logic circuit for automatic electric release of vehicle parking brakes utilizing alternating current derived from an alternator driven by the vehicle engine in association with suitable switch interlocks controlled by the orientation of conditions of mechanisms to render the logic circuit effective for activating the brake release means.

Another object of the invention resides in a system for effecting automatically the release of the parking brake mechanism through a release means actuable by electric energy delivered from an energy source rendered effective only during operation of the internal combustion engine or prime mover of the vehicle.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a portion of an operator's compartment of an automotive vehicle with certain portions broken away, illustrating a form of parking brake control mechanism and release means forming components of the system and apparatus of the invention;

FIGURE 2 is an enlarged side elevational view of the parking brake control illustrating components of the release system for the control;

FIGURE 3 is a top plan view of the construction shown in FIGURE 2 with certain portions broken away;

FIGURE 4 is a view similar to FIGURE 2 showing components of the parking brake control mechanism in brake setting position;

FIGURE 5 is an isometric view illustrating certain components of the release mechanism;

FIGURE 6 is a front elevational view of a coiled element for holding the parking brake mechanism in brake setting position;

FIGURE 7 is a side elevational view of the construction shown in FIGURE 6;

FIGURE 8 is a schematic view illustrating the circuits and controls of the automatic brake release system for the vehicle parking brakes;

FIGURE 9 is a fragmentary schematic diagram showing a modified circuit arrangement for the automatic release system for parking brakes, and FIGURE 10 is a schematic diagram showing another arrangement for the automatic release system for parking brakes.

While the system and apparatus of the invention are particularly adaptable for use in automatically effecting release of the vehicle parking brake mechanism under certain conditions of components or mechanisms of an automotive vehicle, it is to be understood that the system and arrangement may be utilized for actuating or controlling other apparatus under a particular set of operating conditions.

While the arrangement of the invention is embodied in foot-operated parking brake actuating and control means for an automotive vehicle, it is to be understood that the release system may be used with other types of parking brake actuator and control mechanisms.

Referring to the drawings in detail and initially to FIGURE 1, there is illustrated a form of parking brake control mechanism and components of the automatic parking brake release system of the invention. The portion of the vehicle illustrated in FIGURE 1 is inclusive of a cowl 10, a windshield 11, a dashboard 12 forming a front wall of the operator's compartment, an instrument panel 15, the conventional service brake pedal 17, a steering post 19 and a steering wheel 20.

Also mounted by the steering post 19 is a speed selector lever 22 which is connected with a rod 24, shown in FIGURE 8, the latter being connected with speed changing mechanism of the automatic type in a transmission housing 145, the speed changing mechanism being of conventional construction for transmitting power from the internal combustion engine, shown schematically at 144 in FIGURE 8, carried by the chassis frame 28 to the vehicle drive wheels.

A portion 28 of the chassis frame of the vehicle is illustrated in FIGURE 1 which comprises parallel side frame members, one of which is shown at 29 joined by cross members (not shown) of conventional construction.

Secured to the side frame members 29 are brackets 30, one of which is shown in FIGURE 1, the brackets journally supporting a shaft 32. Fixed upon the shaft 32 is an arm 34 connected by a rod 36 or other suitable means with the vehicle parking brakes associated with a pair of road wheels (not shown) of the vehicle, the parking brakes being of conventional construction. The service brakes (not shown) of the vehicle are adapted to be operated by the service brake pedal 17 journaled on the shaft 32, a rod 38 being connected to the pedal 17 and arranged to actuate hydraulic means (not shown) of conventional construction for setting the service brakes.

Secured on the shaft 32 is an arm 40 provided at its distal end with a pin 42 arranged for traverse in a slot 44 provided in a link 45. The link 45 is connected to the lower end of a flexible cable 46 enclosed in a tubular sheath 48, the opposite end of the cable being equipped with a clevis 50 for connection with parking brake actuating and controlling mechanism. A contractile spring 52 is anchored at one end by a pin 54 carried by a side frame member 29, and the other end of the spring connected with the link 45.

The contractile spring 52, in conjunction with conventional brake shoe retracting springs (not shown), normally biases the link 45 in a right-hand direction as viewed in FIGURE 1 toward parking brake release position. The parking brake actuating and controlling mechanism in the operator's compartment is mounted on a support means 55 comprising two mating sections 56 and 57 formed of sheet metal which are welded together at contiguous regions 58 and 59 indicated in FIGURE 3. The forward ends of the support sections 56 and 57 are provided respectively with flange portions 60 and 61 which are secured to the dashboard 12 by bolts 62.

The rear ends of the support sections are fashioned with flanges 63 and 64 secured to a bracket 66 by bolts 67, the bracket being welded or otherwise secured to the instrument panel 15. The upper regions of the sections 56 and 57 are formed respectively with transverse flanges 69 and 70. The brake actuating mechanism includes a brake actuator, lever or member 72 which, in the embodiment illustrated, is a foot-operated lever having a foot pad portion 73. The lever member 72 is provided with a member 74 of the same general contour as the upper portion of the lever 72 and is welded to the lever 72 as indicated at 76.

Disposed between the member 74 and the lever 72 is a member or plate 78 secured to the lever 72 and the member 74 by rivets 80. The lever 72 is fulcrumed or pivotally mounted on the support means 56 by a stub shaft or rivet 82 which extends through aligned openings in lever 72, member 74, plate 78 and the mating sections 56 and 57 of the support means whereby the lever 72 is movable relative to the support means.

The clevis 50, secured to the upper end of the flexible cable 46, is pivotally connected to the upper end of the lever 72 and the member 74 by a stub shaft or rivet 84. A semi-hard rubber buffer 86, mounted on a rivet 88 extending through openings in the mating support sections 56 and 57, serves to cushion the rebound of the lever 72 when the same is returned to brake release position under the influence of the brake springs and spring 52.

The arrangement includes means for holding the parking brakes in "brake set" position when the lever 72 is moved by the operator to set the brakes. Extending through an opening in the support section 56 is a rivet or stub shaft 92. Journaled on the stub shaft 92 is a pinion or gear 94, the teeth of the pinion 94 being meshed with teeth 96 formed on an arcuate region of the plate 78, as particularly shown in FIGURES 1, 2 and 4. Welded to the pinion 94 is a hollow drum or cup-shaped member 98 formed of sheet metal, shown in FIGURE 3. The drum may be made as an integral part of the pinion 94 if desired.

Associated with the drum 98 is a retaining or locking means for holding the lever 72 and parking brakes in "brake setting" positions. The retaining or locking means is inclusive of a coiled spring or element 100 having a series of close convolutions 102 which are comparatively thin in comparison with their width as shown in FIGURES 6 and 7.

Each of the convolutions is of rectangular cross section. The interior diameter of the coiled element 100 is of a dimension to snugly fit onto the exterior cylindrical surface of the drum 98.

The coiled element 100 has a projecting terminal portion or leg 104 forming a continuation of one end of the spring, the terminal portion 104 being anchored to the support section 57 by means of a bracket 106 or other suitable anchoring means. The other end of the coiled element provides a rectilinear terminal portion 108 which is unsecured and free of the support means as shown in FIGURE 2. The convolutions 102 of the coiled element 100 are hardened or tempered in a prestressed or tensioned condition whereby the convolutions inherently frictionally grip the exterior cylindrical surface of the drum 98, the gripping characteristics of the spring being adequate to retain or hold the parking brakes in a "set" position.

The convolutions 102 of the spring element 100 are coiled in a direction whereby the frictional grip of the convolutions on the drum 98 may be easily released by movement of the unsecured terminal portion 108 of the coil spring in a left-hand direction as viewed in FIGURES 2 and 4. It should be noted that the distance of the axis of the fulcrum pin 82 to a pitch line of the teeth 96 on plate 78 is several times the distance from the axis of the stub shaft 92 to a pitch line of the teeth on the pinion 94.

Through this arrangement, a motion multiplying means or force reducing means is provided so that a comparatively small gripping force of the coiled element 100 on the drum 98 is sufficient to hold or retain the drum 98 in a position to which it is rotated by pivotal movement of the lever 72 toward brake setting position.

The arrangement is inclusive of release means which is automatically releasable through the system and apparatus of the invention or which may be manually released by the operator. The release means comprises a member 112 which is fashioned with a partial cup-shaped region 114 which extends interiorly of the drum 98 and has an opening 116 accommodating the rivet or stub shaft 92 which forms a journal support for the member 112. In this manner the release member 112 is mounted for relative rotatable or pivotal movement about the axis of the stub shaft 92.

The member 112 is provided with an arm or portion 120 from which extends a transverse pad portion or projection 122. The pad portion 122, upon counterclockwise rotation of the member 112 about the stub shaft 92 as viewed in FIGURES 2 and 4, engages the terminal 108 to move the terminal a slight distance in a left-hand direction to release the frictional gripping force of the spring convolutions 102 on the drum 98 whereby the brake springs return the lever or member 72 to its initial position as the drum 98 rotates unrestricted in a clockwise direction as viewed in FIGURE 4 during brake releasing movement of the lever 72.

The release member 112 is normally held in a position wherein the pad portion 122 is out of engagement with the terminal 108 by a contractile coil spring 123, one end region 124 of the spring engaging in an opening in a flange 70 of the support section 57, the other end 125 of the spring engaging in an opening in an ear portion 126 of the member 112 to normally bias the release member to the position shown in FIGURE 2 with the pad 122 out of engagement with the terminal 108 of the coiled element 100. Thus, the coiled element is in frictional gripping engagement with the drum 98 whenever the pad 122 is out of engagement with the terminal 108 as shown in FIGURE 2.

It is found that through the motion multiplying arrangement provided by the difference in pitch radii of the teeth 96 on the plate 78 and the pinion 94, the gripping force of the coiled element on the drum holds the parking brakes in "set" position, and comparatively slight pressure on the distal or terminal portion 108 of the coiled element 100 is sufficient to release the frictional grip of the convolutions 102 on the drum 98.

The invention embraces a system, method and arrangement for automatically releasing the frictional grip of the coiled element on the drum 98 by motive means under a predetermined set of conditions and to prevent automatic release of the parking brake mechanism until the predetermined set of conditions is established.

In the illustrated embodiment of the system, an electrically energizable solenoid means provides the motive means controlled by a logic circuit for actuating the release member 112 for releasing the frictional grip of the coiled element 100 on the drum 98.

Secured to a projection or member 127, shown in FIGURE 3, formed on or carried by the support section 57 is a cylindrically-shaped housing 128 containing or enclosing a solenoid coil 129 of conventional construction, shown schematically in FIGURE 8. Disposed interiorly of the coil is a core 130 of soft iron or magnetizable material, the core 130 being reciprocable relative to the solenoid coil.

As particularly shown in FIGURE 5, the end region of the core 130 exterior of the housing 128 is provided with a slot 132 accommodating one end of a link 134 pivoted to the core 132 by a pin 136, the other end of the link being connected by a pivot pin 138 with the upper end of the portion or extension 120 on the release member 112. When the solenoid coil 129 is de-energized, the core 130 extends a substantial distance exteriorly of the housing 128, the release member 112 being in the position shown in FIGURE 2 under the influence of the spring 123.

With the solenoid partially withdrawn from the interior of the coil 129, energization of the coil moves the solenoid core 130 in a left-hand direction as viewed in FIGURE 2 under the electromotive forces developed by current flow in the coil, this action moving the release member 112 to the position shown in FIGURE 4 wherein the pad or projection 122 engages and moves the terminal 108 to a position releasing the gripping force of the convolutions 102 of the coiled element 100 on the drum 98 to effect release of the parking brake mechanism.

In order to provide for automatic release of the brakes only under predetermined conditions viz when the engine of the automotive vehicle is in operation and the speed selector 22 of the transmission mechanism in an operative position to establish power to the drive wheels of the vehicle, it is essential that a controlling force or logic source be utilized for releasing the parking brakes which is driven by the vehicle engine or is effective only when the vehicle engine is in operation.

A logic circuit of the components of the system including the prime mover or combustion engine for operating the vehicle is illustrated in FIGURE 8. It has recently become conventional practice to utilize an alternator type of electric current generator on automotive vehicles because of the reduced weight of an alternator as compared with that of a direct current generator, the characteristic of developing current at low engine speeds, and the elimination of a commutator and output control components.

The current from the alternator, driven by the prime mover or engine, is rectified by conventional means to provide direct current for charging the conventional storage battery or accumulator with which an automotive vehicle is equipped for operating or energizing automotive electrical equipment. Thus, the alternator provides alternating current which is generated so long as the alternator is in operation by the vehicle engine. In the present invention, the alternating current produced by the alternator is utilized as an electromotive or logic force for releasing the parking brake mechanism under predetermined conditions.

As shown in FIGURE 8, 144 designates schematically an internal combustion engine installed in and utilized as a prime mover for the automotive vehicle. An alternator 146 is driven by the engine 144 by belt 148 engaging an engine driven pulley 150 and a pulley 152 mounted on the shaft 154 of the alternator. The alternator, being of a conventional type, generates alternating current only when the same is rotated by operation of the engine 144 and, through the current rectifier, is otherwise isolated from the direct current circuit and output of the rectifier.

Conductors 156 and 158 from the alternator conduct the alternating current output to a rectifier 160 of conventional construction, such as a diode rectifier, which rectifies the alternating current to provide direct current.

One side of the direct current output from the rectifier 160 is grounded to the vehicle frame as shown schematically at 162, and the other direct current line or conductor 164 is connected to the positive side of the conventional storage battery or accumulator (not shown) intercalated in the conventional electrical system of the automotive vehicle.

The brake release system is interconnected or interlocked by switch means with the transmission speed selector means so that unrectified alternating current derived direct from the alternator utilized for energizing the solenoid coil 129 is ineffective to effect automatic release of the parking brakes when the speed selector means is in parking or neutral position. When the engine is running, movement by the vehicle operator of the speed selector means to a drive speed position or low speed or reverse position completes the logic circuit to the solenoid coil 129 to thereby automatically effect release of the parking brakes so that the vehicle will not be operated when the parking brakes are in "set" position.

The speed selector rod is equipped with an indicator 166 cooperating with a speed selector panel 168 of conventional character to indicate the gear changes and speeds within the range of the automatic transmission contained in a housing 145 for transmitting power from the engine to the drive wheels of the vehicle. Secured to or operated by the speed selector rod 24 is a cam plate 170. The indicator panel 168 is conventionally provided with letters indicating positions of the speed selector means, viz. "P" for park, "R" for reverse, "N" for neutral, "D" for drive and "L" for low speed.

The cam plate 170 is provided with a cam lobe or land 172 for the reverse position, an elongated cam lobe 174 for drive and low speed positions and indentations or recesses 176 and 178 for park and neutral positions. Disposed adjacent the cam plate 170 is a cam follower or member 180 arranged for relative movement to open and close a switch 182 dependent upon the position of the member 180 under the influence of the indentations and lobes on the cam plate 170.

The alternator output conductor 158 is connected by a conductor 184 to one contact of the switch 182. The other contact of the switch 182 is connected by a conductor 186 to one end of the solenoid coil 129 in the housing 128. The other end of the solenoid coil 129 is connected by a lead 188 with a terminal 190 mounted on a switch housing 191 containing a switch mechanism 192, shown in FIGURE 2 intercalated in the logic circuit and controlled by the relative position of the parking brake actuating lever 72. The switch housing is mounted on the flanges 69 and 70 of the support means 55. The terminal 194 mounted on the switch housing is grounded through a conductor 196.

The terminals are respectively connected with a stationary contact 198 and a movable contact 200, shown in FIGURE 2, the latter being supported upon a movable switch arm 202, the position of which is controlled by a member 204 fixedly secured to or associated with the brake actuating lever 72, as shown in FIGURE 2. A spring means 206 or other suitable means normally biases the switch member 202 toward a position to interengage the contacts 198 and 200 whenever the member 204 is out of engagement with the switch arm 202.

The functioning or operation of the automatic brake release system is as follows under various sets of conditions: A precondition is that the operator has depressed the brake actuating lever 72 from the position shown in FIGURE 2 to the position shown in FIGURE 4 to "set" the parking brakes of the vehicle. It will be apparent from FIGURE 2 that movement of the lever 72 in a clockwise direction about its fulcrum toward brake setting position effects a disengagement of the member 204 with the switch arm 202 in the housing 191 to thereby interengage the contacts 198 and 200 under the influence of the spring 206.

This action fulfills one condition or logic input necessary for automatically releasing the brake mechanism. When the engine or prime mover 144 of the vehicle is not in operation, no current is produced by the alternator for energizing the solenoid coil 129 and hence, automatic release of the brake mechanism cannot take place. With the engine in operation and the speed selector means 22 in "parking" position or in "neutral" position, no automatic release of the brakes takes place because the switch 182 is in open position due to engagement of the switch actuating member 180 in the recess 176 or in the recess 178 of the cam plate 170.

With the engine in operation, movement of the speed selector means 22 to reverse "R" position or drive "D" position or low speed "L" position, the cam lobe 172 or the lobe 174 actuates the member 180 to close the contacts of the switch 182 to complete a circuit for current flow from the alternator through the switch 182 through the coil 129 and the contact terminals 198 and 200 to thereby energize the solentid coil 129.

Energization of the coil 129 retracts or moves the magnetizable core 130 into the solenoid coil causing counterclockwise movement of the release member 112 as viewed in FIGURES 2 and 4 to engage the pad portion 122 of the release member with the free end or terminal 108 of the coiled element 100 and thereby release the frictional grip of the convolutions 102 of the coiled element on the drum 98, permitting the lever 72 to be moved to brake release position under the influence of the brake springs and the spring 52 shown in FIGURE 1.

Upon the complete retraction or return of the lever 72 to brake release position, shown in FIGURE 2, the member 204 carried by the lever engages the switch arm 202 and disengages the contacts 198 and 200 thus blocking or preventing energization of the solenoid coil 129 so long as the parking brakes are in full release position. When the parking brake actuating lever 72 is moved away from its initial position toward brake setting position, contacts 198 and 200 are automatically engaged to condition the automatic release circuit, subject however to the position of the contacts of switch 182.

Thus, if the parking brakes are moved to "brake set" position and the engine is operating to generate current by the alternator 146, with the speed selector means in either park position or neutral position, the circuit is ineffective to release the parking brakes because the contacts of switch 182 are open.

When the engine and alternator are operating and the speed selector means is moved to "reverse," "drive" or "low" position, the member 180 is moved either by the cam lobe 172 or the lobe 174 to close the contacts of switch 182, thus completing the circuit to the solenoid coil 129 and automatically releasing the parking brakes.

Through this method or system, the parking brake, when in "set" position is automatically released before the vehicle is moved by the engine 144. One of the important features is that the parking brakes will not be automatically released unless the alternator 146 or engine driven current source is in operation.

FIGURE 9 illustrates a modified system and arrangement providing automatic release of parking brakes under the conditions as hereinbefore described in connection with the circuit arrangement shown in FIGURE 8. In FIGURE 9, the engine or prime mover 144' drives the alternator 146', the output conductors 156' and 158' conveying alternating current to the rectifier 160' providing direct current for the conventional direct current electrical system of an automotive vehicle. The negative side of the direct current output is grounded as at 162', and the positive conductor 164' is connected with the storage battery or accumulator (not shown) of the vehicle electrical system.

A second engine-operated current source or current generating means 210, which may be a second alternator for generating A.C. current or a generator for producing direct current, is driven by the shaft 212 of the alternator 146' or by other engine operated means. The circuit of the second current source 210 is wholly independent of the circuit of the alternator 146' and the conventional electrical system of the vehicle. One current conductor from the electric current source or generator 210 is grounded as at 214.

The other conductor 216 is in circuit with the switch 182' being connected with one of the switch contacts, the switch 182' being actuated by a member 180' controlled by the speed selector means in the same manner as illustrated in FIGURE 8. The other contact of the switch 182' is connected by a lead 186' with the solenoid coil 129'. The current source 210 may be of a character to produce a low voltage, low amperage current sufficient to energize the coil 129' to effect movement of the solenoid core 130'.

The heat developed by current generated by the current source 210 may be dissipated into the ambient atmosphere by a fan 218 mounted on the shaft 212, or the heat may be dissipated by other conventional means. Thus it will be seen that an essential factor of the system is the utilization of a current source which develops current only when the vehicle engine is in operation for effecting automatic release of the parking brake mechanism under the several conditions herein described.

FIGURE 10 illustrates a further modification of the system and arrangement providing automatic release of parking brakes under the conditions hereinbefore described in connection with the circuit arrangement shown in FIGURE 8. In FIGURE 10, the electric current source for actuating the brake release means is direct current and the circuit for the brake release means is energized through switch means rendered effective only when the engine is in operation. In FIGURE 10, the engine 144" drives the alternator 146", the output conductors 156"

and 158" conveying alternating current to the rectifier 160" providing direct current for the conventional direct current electrical system of the automotive vehicle.

The negative side of the direct current output is grounded as at 162", and the positive conductor 164" connected with the storage battery or accumulator (not shown) of the vehicle electrical system. Arranged to be driven by the alternator shaft 212" or other engine driven means is a centrifugal switch 220 of conventional construction. The centrifugal switch 220 is of the type wherein rotation of a component of the switch mechanism closes a circuit therethrough, the switch being opened automatically and the circuit interrupted when rotation of the centrifugal switch ceases.

A conductor 224 is connected with one contact of the centrifugal switch 220 and with the rectifier 160" and the conductor 164" connected with the storage battery or accumulator (not shown) of the conventional vehicle electrical system.

The other switch contact of the centrifugal switch 220 is connected with one contact of the switch 182", the switch being actuated by member 180" controlled by the speed selector means in the same manner as illustrated in FIGURE 8. The other contact of the switch 182" is connected by a conductor 186" with the solenoid coil 129', which is shown in FIGURE 9.

When the engine is in operation, the contacts of the centrifugal switch 220 are in engagement or closed position, completing a direct current circuit from the storage battery and rectifier 160" to the switch 182" whereby direct current is available for energizing the solenoid coil 129' dependent upon the relative position of the speed selector controlled member 180".

When the engine 144" is not in operation, the contacts of the centrifugal switch 220 are out of engagement, thus preventing energization of the release means as the solenoid coil cannot be energized until operation of the engine causes rotation of the centrifugal switch 220 to close the contacts thereof to energize the circuit to the switch 182" the position of which controls energization of the solenoid coil of the release means.

It is to be understood that the switch 192 (shown in FIGURE 8) controlled by the parking brake actuator is in circuit with the solenoid coil in the same manner as shown in FIGURE 8.

Through the utilization of an engine controlled or engine operated centrifugal switch 220, no current is available for the parking brake release solenoid mechanism until the engine is in operation. Hence the parking brake release means will not be actuated automatically until the engine is in operation and other conditions established as described in reference to the arrangement shown in FIGURE 8.

The system of the invention for automatically releasing the parking brakes does not, in any wise, interfere or prevent the vehicle operator from manually releasing the parking brakes at any time by manual actuation of the release member 112 or 112'. The system of the invention utilizing an engine-operated or engine-controlled current or current source for effecting automatic release of the parking brakes assures against automatic release of the parking brakes whenever the engine of the vehicle is not in operation, irrespective of other logic input factors which must be correlated as herein described before automatic release the brakes can occur.

The system assures against engine-driven movement of the vehicle with the parking brakes in a "set" position, thereby relieving the vehicle operator from the responsibility of ascertaining whether the parking brakes are in "set" or "released" position.

It is apparent that, within the scope of the invention, modifications and different arrangements may be made other than as herein disclosed, and the present disclosure is illustrative merely, the invention comprehending all variations thereof.

I claim:

1. A system for automatic release of the parking brakes of an automotive wheeled vehicle powered by an internal combustion engine, in combination, means for setting the parking brakes of the vehicle, locking means for retaining the parking brakes in brake-setting positions, electrically actuable means for releasing said locking means, a circuit for said electrically actuable release means, engine driven means for supplying current to said circuit only when the engine is in operation, and switch means in said circuit operable upon establishment of an operative drive connection of the engine with power transmission mechanism to effect current flow in the circuit and thereby actuate the electrically actuable means to release the parking brake locking means.

2. A system according to the combination of claim 1 wherein the means supplying current is an engine-driven generator.

3. A system according to the combination of claim 1 wherein alternating current is supplied from an engine-driven alternator.

4. A system according to the combination of claim 1 including a second switch means intercalated in the circuit, said second switch means being controlled by the brake-setting means preventing actuation of the electrically actuable release means when the brake-setting means is in brake release position.

5. A logic circuit for automatic electrically controlled release of locking means for parking brake actuating means of an automotive wheeled vehicle powered by an internal combustion engine and having power transmission mechanism controlled by speed selector means, an electrically actuable release instrumentality for the locking means in said circuit, an engine-driven current-generating source of electric current for said circuit effective to supply current for the circuit only when the vehicle engine is in operation, and switch means intercalated in said circuit rendered effective to energize the electrically actuable instrumentality to automatically release the parking brake locking means by the relative positions of the speed selector means operative to establish driving connection of the engine with the power transmission mechanism.

6. A logic circuit according to claim 5 wherein the electrically actuable release instrumentality is a solenoid mechanism, and the source of electric current is an engine-driven alternator.

7. A logic circuit according to claim 5 including a second switch means in said circuit, said second switch means being controlled by the parking brake actuating means, said second switch means being opened by the brake actuating means in brake-release position to prevent energization of the release instrumentality.

8. In an automotive wheeled vehicle powered by an internal combustion engine through speed selector controlled power transmission mechanism and provided with parking brakes, parking brake actuating means for setting the parking brakes, locking means for retaining the parking brake actuating means in brake setting positions, an engine-driven electric current generator for generating current only during engine operation, solenoid actuated release means for said locking means, a circuit for conducting current from the generator to the solenoid of the release means, a first switch in said circuit controlled by the relative position of the transmission speed selector, and a second switch in said circuit controlled by the relative position of the parking brake actuating means.

9. The combination according to claim 8 wherein the said switches are connected in series relation and arranged whereby the circuit is energized to actuate the release solenoid when the parking brakes are in brake-setting position and the speed selector is in a position establishing driving connection with the power transmission mechanism, and the circuit interrupted to prevent energization of the release solenoid when the speed selector is in a nondrive position or the parking brakes are in a released position.

10. The combination according to claim 8 wherein the electric current generator is an alternator providing alternating current.

11. The combination according to claim 8 wherein the parking brake actuating means includes a foot operated lever fulcrumed on a support, said lever provided with rack teeth, a drum journaled on the support and having a pinion portion in mesh with the rack teeth on the lever, the locking means comprising a coiled element surrounding the drum normally in frictional engagement therewith and having one end region anchored to the support and the other end region arranged for free movement, and said release means including a member actuated by the solenoid engageable with the free end region of the coiled element to release the drum whereby the foot operated lever is released for movement to brake release position.

12. In an automotive wheeled vehicle powered by an internal combustion engine through speed selector controlled power transmission mechanism and provided with parking brakes, a support, parking brake actuating means for setting the parking brakes including a foot operated lever fulcrumed on the support, locking means for retaining the parking brake actuating means in brake setting positions including a drum journaled on the support, motion multiplying means establishing operative connection between the lever and the drum, said locking means including a coiled element surrounding and frictionally gripping the drum, an electric current generator for generating current only during engine operation, solenoid actuated means for releasing the coiled element from gripping engagement with said drum, a circuit for conducting current from the generator to the solenoid of the release means, a first switch in said circuit controlled by the relative position of the transmission speed selector, and a second switch in said circuit controlled by the relative position of the parking brake actuating lever, said switches being connected in series relation and arranged whereby the circuit is energized to actuate the release solenoid when the parking brakes are in brake-setting position and the speed selector is in a position establishing driving connection with the power transmission mechanism, and the circuit interrupted to prevent energization of the release solenoid when the speed selector is in a nondrive position.

13. A system for automatic release of the parking brakes of an automotive wheeled vehicle powered by an internal combustion engine, in combination, means for setting the parking brakes, locking means for retaining the parking brakes in brake setting positions, electrically actuable means for releasing said locking means, a circuit for said electrically actuable release means, an engine-driven source of electric current for said circuit, and switch means in said circuit operable only when the engine is in operation for supplying current to said circuit.

14. A system for automatic release of the parking brakes of an automotive vehicle powered by an internal combustion engine, in combination, means for setting the parking brakes, locking means for retaining the parking brakes in brake setting position, electrically actuable means for releasing said locking means, a circuit for said electrically actuable release means, a source of electric current for said circuit, and an engine-driven centrifugal switch means in said circuit operable only when the engine is in operation for supplying current to said circuit.

References Cited
UNITED STATES PATENTS

| | | | |
|---|---|---|---|
| 2,968,378 | 1/1961 | Yanda | 192—4 |
| 3,036,677 | 5/1962 | Pracher | 192—4 |
| 3,107,762 | 10/1963 | Snyder et al. | 192—4 |
| 3,299,999 | 1/1967 | Martin | 192—4 |

DONLEY J. STOCKING, *Primary Examiner.*

ARTHUR T. McKEON, *Examiner.*